United States Patent
Ramachandiran et al.

(10) Patent No.: US 12,010,404 B2
(45) Date of Patent: Jun. 11, 2024

(54) DYNAMIC USER ENGAGEMENT AND AUXILIARY SEARCH ON STREAMING MEDIA CONTENT

(71) Applicant: ARRIS Enterprises LLC, Suwanee, GA (US)

(72) Inventors: Kanakendiran Ramachandiran, Bengaluru (IN); Vinod Jatti, Bengaluru (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/955,419

(22) Filed: Sep. 28, 2022

(65) Prior Publication Data

US 2023/0101319 A1 Mar. 30, 2023

Related U.S. Application Data

(60) Provisional application No. 63/249,266, filed on Sep. 28, 2021.

(51) Int. Cl.
*H04N 21/8545* (2011.01)
*H04N 21/84* (2011.01)
*H04N 21/858* (2011.01)

(52) U.S. Cl.
CPC ......... *H04N 21/8545* (2013.01); *H04N 21/84* (2013.01); *H04N 21/858* (2013.01)

(58) Field of Classification Search
CPC ... H04N 21/8545; H04N 21/84; H04N 21/858
See application file for complete search history.

(56) References Cited

U.S. PATENT DOCUMENTS

| | | | |
|---|---|---|---|
| 2011/0289530 A1* | 11/2011 | Dureau | G06F 16/78 725/38 |
| 2013/0086105 A1* | 4/2013 | Hammontree | G06F 16/248 707/769 |
| 2014/0089985 A1* | 3/2014 | Kawakita | H04N 21/8405 725/53 |
| 2020/0077155 A1* | 3/2020 | Bryant | H04N 21/4828 |

* cited by examiner

*Primary Examiner* — Kyu Chae
(74) *Attorney, Agent, or Firm* — Chernoff, Vilhauer, McClung & Stenzel, LLP

(57) ABSTRACT

The present disclosure describes techniques for performing auxiliary search on streaming media content. The techniques according to the present disclosure may comprise streaming media content to a display of a user and, receiving at least one query associated with a frame of the streamed media content. The techniques further comprise comparing the at least one query with metadata associated with the streamed media content to generate one or more results, and providing the one or more generated results to the display.

14 Claims, 4 Drawing Sheets

200

210

DYNAMIC USER ENGAGEMENT AND AUXILIARY SEARCH ON STREAMING MEDIA CONTENT

CROSS-REFERENCE TO RELATED APPLICATIONS

The present application claims priority to U.S. Provisional App. No. 63/249,266 filed Sep. 28, 2021, the content of which is incorporated herein by reference in its entirety.

TECHNICAL FIELD

The present disclosure in general relates to media content streaming. More particularly, but not exclusively, the present disclosure relates to techniques of performing an auxiliary search on streaming media content.

BACKGROUND

The realm of digital delivery of multimedia content to viewers has been rapidly advancing. Various types of multimedia content include video clips, electronic games, and interactive content. In particular, content delivery is currently performed using two approaches: legacy content distribution and over-the-top (OTT) content distribution.

Media content such as over-the-top (OTT)/video on demand (VOD) are presently in wide demand as compared to legacy cable channels. OTT content distribution is the delivery of audio, video, and other types of multimedia content over the Internet without any control of the content distribution by the network operators and/or by the content providers. Examples for OTT content providers are Amazon Prime Video, Netflix, and the like.

Over-the-top services are typically accessed via websites using personal computers as well as applications on mobile devices (such as smartphones and tablets), digital media players or televisions with integrated smart TV platforms such as fire TV stick, etc. Even streaming personal user video content is becoming popular.

Presently, media content streaming is limited in terms of user interaction. A user, while watching streamed media content might be interested in more details about a specific part of content, and might therefore be receptive to navigating to different media content related to the context of the currently viewed video context, which could relate to the geographic location of media content being played, the date and/or time that the video content was captured, details about any surrounding scenario of personal interest, a specific object within the video like some animal, etc.

For example, assume that a user is watching a "Glacier National Park" video that describes a specific trail, and which was recorded five years ago during summer. The user might want to watch the same trail from a different view, a different season, a more recent recorded video of the trail, or perhaps another trail in the same surrounding geography. Existing over-the-top services, however, do not provide dynamic user interaction based on a user's personal interest or preference.

Thus, a need exists in the art to provide a technique which overcomes the above-mentioned problems, to provide dynamic user engagement with media content and auxiliary content search capabilities on the streaming media content based on user's personal interest or preference.

The information disclosed in this background section is only for enhancement of understanding of the general background as identified in the disclosure and should not be taken as an acknowledgement or any form of suggestion that this information forms the prior art already known to a person skilled in the art.

SUMMARY

An object of the present disclosure is to provide enhanced dynamic user engagement with streaming media content.

Another object of the present disclosure is to facilitate auxiliary content search on the streaming media content based on user's personal interest or preference.

Yet another object of the present disclosure is to ensure efficient content delivery and superior Quality of Experience (QoE) to the end user.

The above stated objects as well as other objects, features, and advantages of the present disclosure will become clear to those skilled in the art upon review of the following description, the attached drawings, and the appended claims.

In one non-limiting embodiment of the present disclosure, a method comprises streaming media content to a display of a user and receiving at least one query associated with a frame of the streamed media content. The method comprises comparing the at least one query with metadata associated with the streamed media content to generate one or more results and providing the one or more generated results to the display of the user.

In another non-limiting embodiment of the present disclosure, the metadata associated with the streamed media content comprises at least one of: geographical coordinates associated with a location present in the frame of the streamed media content, a name of the location present in the frame of the streamed media content, the date and/or time of recording the streamed media content, details of one or more artists present or associated with the streamed media content, and information associated with one or more objects present in the streamed media content or any combinations thereof.

In yet another non-limiting embodiment of the present disclosure, the one or more results are generated based on a context of the streamed media content, and wherein the one or more results comprise at least one of one or more navigation links to different media content associated with the context of the streamed media content, maps for navigating to a location present in the streamed media content, details of objects present in the frame, and/or recommendations based the context of the streamed media content.

In yet another non-limiting embodiment of the present disclosure, the metadata is chunked along with the media content before transmitting to a media gateway for streaming the media content on the display of the user.

In yet another non-limiting embodiment of the present disclosure, the comparing of the at least one query with metadata associated with the streamed media content comprises applying natural language processing (NLP) techniques and text analytics techniques to the at least one query to determine one or more keywords present in the at least one query, matching the one or more keywords with the metadata chunked with the media content, and generating the one or more results in response to the one or more keywords matching the metadata chunked with the media content, wherein the generated one or more results comprises at least a portion of the metadata matching the one or more keywords.

In yet another non-limiting embodiment of the present disclosure, the method further comprises, in response to the one or more keywords not matching the metadata chunked with the media content, identifying at least one object in a frame associated with the at least one query using a computer vision technique, searching at least one database based on the at least one query and the at least one identified object, and generating the one or more results based on the search.

In yet another non-limiting embodiment of the present disclosure, the method further comprises, in response to the one or more keywords not matching the metadata chunked with the media content, retrieving metadata that matches the one or more keywords from the metadata server and generating the one or more results based on the retrieved metadata.

In yet another non-limiting embodiment of the present disclosure, the method further comprises, in response to the one or more keywords not matching the metadata chunked with the media content, transmitting the at least one query to a metadata server, processing the at least one query by a metadata service administrator, updating existing repository of the metadata server to include details associated with the at least one query, and notifying the user with the details associated with the at least one query.

In yet another non-limiting embodiment of the present disclosure, the method further comprises receiving a selection of at least one result among the one or more generated results and navigating the user to another media content based on the selected at least one result.

In yet another non-limiting embodiment of the present disclosure, a system comprises a memory and a display unit in communication with the memory. The system may be configured to stream a media content to a display. The system comprises a user interface in communication with the display unit and the memory, and may be configured to receive at least one query associated with a frame of the streamed media content. The at least one query may comprise an audio and/or a text input. The system further comprises one or more processors in communication with the display unit, the user interface, and memory, and the one or more processors may be configured to provide one or more generated results on the display of the user, the one or more generated results produced by a comparison of the at least one query with metadata associated with the streamed media content.

In yet another non-limiting embodiment of the present disclosure, the one or more processors are configured to apply natural language processing (NLP) techniques and text analytics techniques to the at least one query to determine one or more keywords present in the at least one query, match the one or more keywords with the metadata chunked with the media content, and generate the one or more results in response to the one or more keywords matching the metadata chunked with the media content. The generated one or more results comprise at least a portion of the metadata matching the one or more keywords.

In yet another non-limiting embodiment of the present disclosure, the one or more processors are further configured to identify at least one object in a frame associated with the at least one query using a computer vision technique in response to the one or more keywords not matching the metadata chunked with the media content, search at least one database based on the at least one query and the at least one identified object, and generate the one or more results based on the search.

In yet another non-limiting embodiment of the present disclosure, the one or more processors are further configured to retrieve metadata that matches the one or more keywords from a metadata server in response to the one or more keywords not matching the metadata chunked with the media content and generate the one or more results based on the retrieved metadata.

In yet another non-limiting embodiment of the present disclosure, the system further comprises a transceiver in communication with the one or more processors. The transceiver may be configured to transmit the at least one query to a metadata server. The metadata server comprises a metadata service administrator configured for processing the at least one query, updating existing repository of the metadata server to include details associated with the at least one query, and notifying the user with the details associated with the at least one query.

In yet another non-limiting embodiment of the present disclosure, the one or more processors are further configured to receive, via the user interface, a selection of at least one result among the one or more generated results and navigate the user to another media content based on the selected at least one result.

In yet another non-limiting embodiment of the present disclosure, a non-transitory computer readable medium having computer-readable instructions that when executed by a processor causes the processor to perform operations of streaming a media content to a display of a user, obtaining at least one query associated with a frame of the streamed media content, comparing the at least one query with metadata associated with the streamed media content to generate one or more results, and providing the one or more generated results to the display.

The foregoing summary is illustrative only and is not intended to be in any way limiting. In addition to the illustrative embodiments, and features described above, further embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. Some embodiments of system and/or methods in accordance with embodiments of the present subject matter are now described, by way of example only, and with reference to the accompanying Figures, in which.

Figure 1:
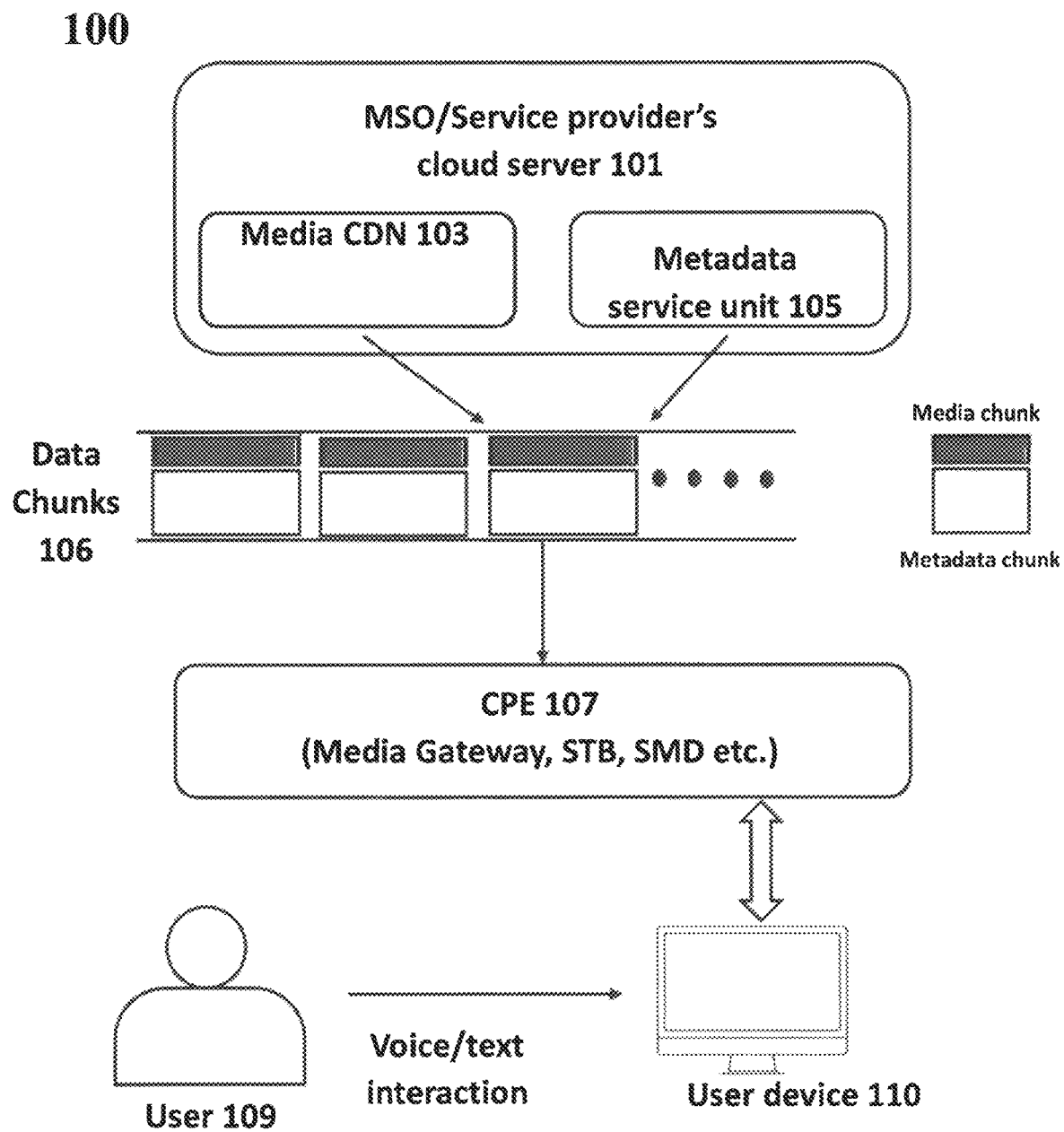
FIG. 1 shows an exemplary architecture 100 of metadata service for tagging metadata on media content to be streamed, in accordance with some embodiments of the present disclosure.

It should be appreciated by those skilled in the art that any block diagrams herein represent conceptual views of the illustrative systems embodying the principles of the present subject matter. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiments thereof have been shown by way of example in the drawings and will be described in detail below. It should be understood, however, that these embodiments are not intended to limit the disclosure to the particular form disclosed, but on the contrary, the disclosure is to cover all modifications, equivalents, and alternatives falling within the spirit and the scope of the disclosure.

The terms "comprise(s)", "comprising", "include(s)", or any other variations thereof, are intended to cover a non-exclusive inclusion, such that a setup, device, apparatus, system, or method that comprises a list of components or steps does not include only those components or steps but may include other components or steps not expressly listed or inherent to such setup or device or apparatus or system or method. In other words, one or more elements in a device or system or apparatus proceeded by "comprises . . . a" does not, without more constraints, preclude the existence of other elements or additional elements in the system.

The terms like "at least one" and "one or more" may be used interchangeably or in combination throughout the description.

In the following detailed description of the embodiments of the disclosure, reference is made to the accompanying drawings that form a part hereof, and in which are shown by way of illustration of specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense. In the following description, well known functions or constructions are not described in detail since they would obscure the description with unnecessary detail.

Disclosed herein is a technique for performing auxiliary content search on the streaming media content. The technique according to the present disclosure comprises streaming a media content on a display, receiving at least one query associated with a frame of the streamed media content. The at least one query comprises an audio or text input. The technique further comprise s comparing the at least one query with metadata associated with the streamed media content to generate one or more results and providing the one or more generated results on the display of the user. Accordingly, the techniques of the present disclosure enable dynamic user engagement and efficient auxiliary search on the streaming media content.

FIG. 1 shows an exemplary architecture 100 of metadata service for tagging metadata on the media content to be streamed, in accordance with some embodiments of the present disclosure.

The architecture 100 may comprise a multi service operator (MSO) or service provider's cloud server 101. The service provider's cloud server 101 may comprise a media content delivery network (CDN) 103 for providing fast delivery of Internet content. The service provider's cloud server 101 also may comprise a metadata service unit 105. The service provider's cloud server 101 may be configured to encapsulate media chunks from the media CDN 103 and metadata chunks from the metadata service unit 105 together into a chunk of data 106 as shown in FIG. 1.

The data chunks 106 may be then transmitted by the cloud server 101 to the customer premises equipment (CPE) 107. The CPE 107 generally refers to devices such as telephones, routers, network switches, residential gateways (RG), set-top boxes (STB), fixed mobile convergence products, home networking adapters and internet access gateways, etc. The CPE 107 may then stream the media content on a display of the user 109.

The user device 110 may include phones (including Android and iOS mobile devices), smart TVs (such as Google TV and LG Electronics' Channel Plus), tablets, desktops, and laptop computers, etc. It may be noted that the MSO 101, media CDN 103, and the CPE 107 may include other essential components/elements required to carry out the desired functionalities and the same have not been explained here for the sake of brevity.

The user 109 may interact with a user device 110 via a user interface (not shown) of the user device 110. The user interface may be a remote controller for operating the user device 110 or any other user interface known to a person skilled in the art. The user 109 may ask a query to the user device 110 in the form of a voice or a text input. The query may be associated with media content being streamed on the user device 110.

The user device 110 may be configured to interpret the query received from the user 109 to generate one or more keywords and compare the one or more keywords with metadata associated with the streamed media content to generate one or more results. The user device 110 may be then configured to display the one or more generated results on the user device 110. In one-non-limiting embodiment, the user 109 may navigate to a different media content as per the user's preference using the generated results.

In an embodiment of the present disclosure, the metadata may not be tagged with the media content and may be stored at the cloud server 101 to save bandwidth. In such a scenario, the user device 110 may retrieve or fetch the metadata from the cloud server based on the one or more keywords of the query.

In an embodiment of the present disclosure, the one or more results may be generated based on a context of the streamed media content. The one or more results may comprise one or more navigation links to different media contents associated with the context of the streamed media content, maps for navigating to a location present in the streamed media content, details of one or more artists present or associated with the streamed media content, details of objects present in the frame of a video, recommendations based on the context of the streamed media content, or any combination thereof.

In one non-limiting embodiment of the present disclosure, the keywords of the query may not match the metadata chunked with the media content and may not be stored on the cloud server 101. In such a scenario, the user device 110 may forward the query to the cloud server 101. The cloud server 101 may be configured to store the query. The metadata service administrator may process the query and generate one or more results. The cloud server 101 may transmit the generated results to the user device 110 via CPE 107. The user device 110 may then display the generated results to the user 109. In another-non-limiting embodiment, the user 109 may navigate to the generated results as per user's preference.

In another non-limiting embodiment of the present disclosure, the keywords of the query may not match the metadata chunked with the media content and may not be saved on the cloud server 101. In such scenario, the user device 110 may perform a computer vision technique on the frame to identify one or more objects present in the frame. The user device 110 may search a plurality of databases to extract information based on the query and the identified objects. The user device 110 may then display the extracted information to the user 109.

Thus, the present disclosure provides dynamic user engagement with the streaming media content and provides auxiliary content search on the streaming media content based on the user's personal interest or preference. In addition, the present disclosure ensures efficient content delivery and superior Quality of Experience (QoE) to the end user.

Figure 2A:
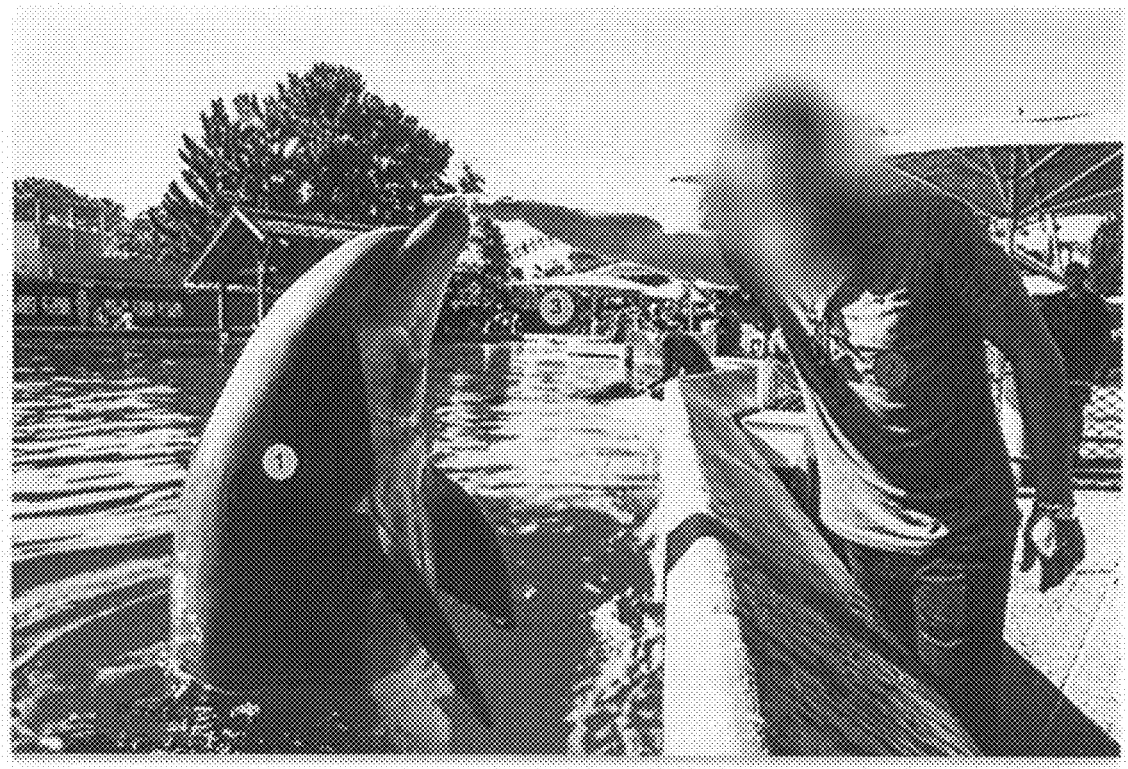
FIG. 2(a) illustrates an exemplary scenario 200 of metadata tagging on streaming media content, in accordance with some embodiments of the present disclosure.

FIG. 2(a) illustrates an exemplary scenario 200 of metadata tagging on streaming media content in accordance with some embodiments of the present disclosure.

As shown in FIG. 2(a), a user may be watching a video of an event held at SeaWorld. The user may pause the video at a desired video frame. The video frame may comprise one or more objects/elements such as a dolphin (1), an actor (2), and an event (3). The objects may have respectively tagged metadata such as one or more shows or movies of the actor present in the video frame, one or more events shot at the SeaWorld, or the species of dolphins, etc. The user may then engage with client application of the user device over a voice interface and ask one or more queries.

For example, the one or more queries may comprise whether the SeaWorld is in the east-coast (Orlando) or west-coast (San Diego), who is the actor shown on right side of the video frame, list more video events of dolphins, etc. The user device may process the query to determine one or more keywords by applying natural language processing (NLP) technique and text analytics technique.

The user device may then match the one or more keyword with the tagged metadata to generate one or more results, and a respective indicator individually associated with the results of each query may be separately displayed graphically on the screen at a location semantically associated with the query's associated results, e.g., results showing more video events of dolphins may be spatially represented by an icon next to the dolphin, and so forth. The user may access the generated results through the user device by selecting these icons or other such visual indicators. Other visual indicators are possible. For example, instead of icons, objects already displayed such as the dolphin, the actor, etc. may be highlighted, shaded, outlined and so forth. In one non-limiting embodiment of the present disclosure, the user may navigate the user interface to select the icons or other visual on-screen indicators of the results, such as in this example one or more video events of dolphins (1), one or more show of the actor (2), or more events at SeaWorld (3).

In an embodiment of the present disclosure, if the query does not match the tagged metadata associated with the particular video frame, the user device may forward or transmit the search query to the cloud server and retrieve the metadata stored at the cloud server. If the metadata is not available at the cloud server, then a metadata service administrator may process the query and update the repository of the cloud server to include details associated with the query. The details associated with the query may be tagged to the respective video frame and then transmitted to the user device. In one non-limiting embodiment, the user may be notified with answer to the query once the details are updated on the cloud server.

In another embodiment of the present disclosure, if the query does not match the tagged metadata associated with the particular video frame, the user device may identify at least one object of the frame associated with the query using a computer vision technique, search at least one database based on the at least one query and the at least one identified object, and generate one or more results based on the search. The results may be transmitted to the user in real-time. In one non-limiting embodiment, the user device may receive the feedback from the user to improve the search results.

Thus, the present disclosure provides dynamic user engagement with streaming media content and provides auxiliary content search on the streaming media content based on the user's personal interest or preference. In addition, the present disclosure ensures efficient content delivery and superior Quality of Experience (QoE) to the end user.

Figure 2B:
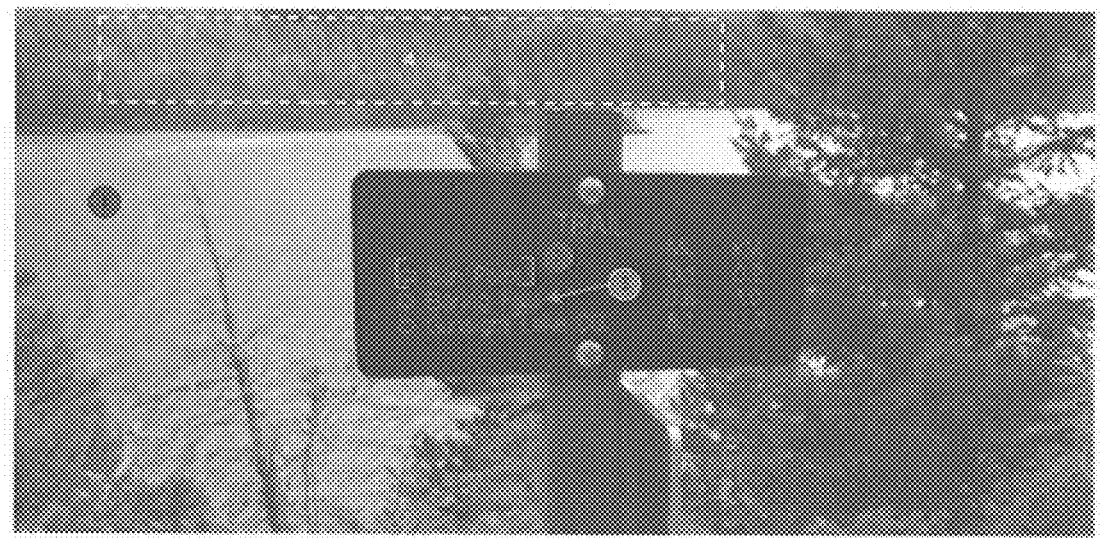
FIG. 2(b) illustrates an exemplary scenario 210 of metadata tagging on streaming media content, in accordance with some embodiments of the present disclosure.

FIG. 2(b) illustrates an exemplary scenario 210 of metadata tagging on streaming media content, in accordance with some embodiments of the present disclosure.

As shown in FIG. 2(b), a user may be watching a movie where part of "Glacier National Park" is presented. The user might not be aware of the scenic location and may want to pause the movie for some time and explore/know more about the location. The paused movie frame may comprise one or more objects/elements such as a river (1), a sign indicting different trails, such as the Sun Point trail (2), Baring Fall trail (3), etc., and a forest (4). The media stream may also comprise metadata associated with these objects.

In an embodiment of the present disclosure, the user may then engage with client application of the user device over a voice interface and audibly make one or more queries. For example, given the context shown in FIG. 2(b), the one or more queries may be a request to display short clips of different trails like 'Baring Falls'; a request to identify the water source behind the board, e.g., whether it is a river or a lake; a request to list nearby hotels or other accommodations, options nearby; what food is available near this location; etc. The user device may process the query or queries to determine one or more keywords by applying natural language processing (NLP) techniques and text analytics techniques.

The user device may then match the one or more keywords with the tagged metadata to generate one or more results. The user may access the generated results through the user device. In one non-limiting embodiment of the present disclosure, the user may navigate to one or more videos of different trails, websites of hotels offering accommodations, food options near the location, maps to navigate to the location shown in the video, details of the forest (4) shown in the video, alternate views of the same location from different angles or at a different season, etc.

In an embodiment of the present disclosure, if the query does not match the tagged metadata associated with particular video frame, the user device may forward or transmit the search query to the cloud server and retrieve the metadata stored at the cloud server. If the metadata is not available at the cloud server, then a metadata service administrator may process the query and update the repository of the cloud server to include details associated with the query. The details associated with the query may be tagged to the respective video frame and then transmitted to the user device. In one non-limiting embodiment, the user may be notified with an answer to the query once the details are updated on the cloud server.

In another embodiment of the present disclosure, if the query does not match the tagged metadata associated with particular video frame, the user device may identify at least one object of the frame associated with the query using a computer vision technique, search at least one database based on the at least one query and the at least one identified object, and generate one or more results based on the search. The results may be transmitted to the user in real-time. In one non-limiting embodiment, the user device may receive the feedback from the user to improve the search results.

Thus, the present disclosure provides dynamic user engagement with the streaming media content and provides auxiliary content search on the streaming media content based on the user's personal interest or preference. In addition, the present disclosure ensures efficient content delivery and superior Quality of Experience (QoE) to the user.

Figure 3:
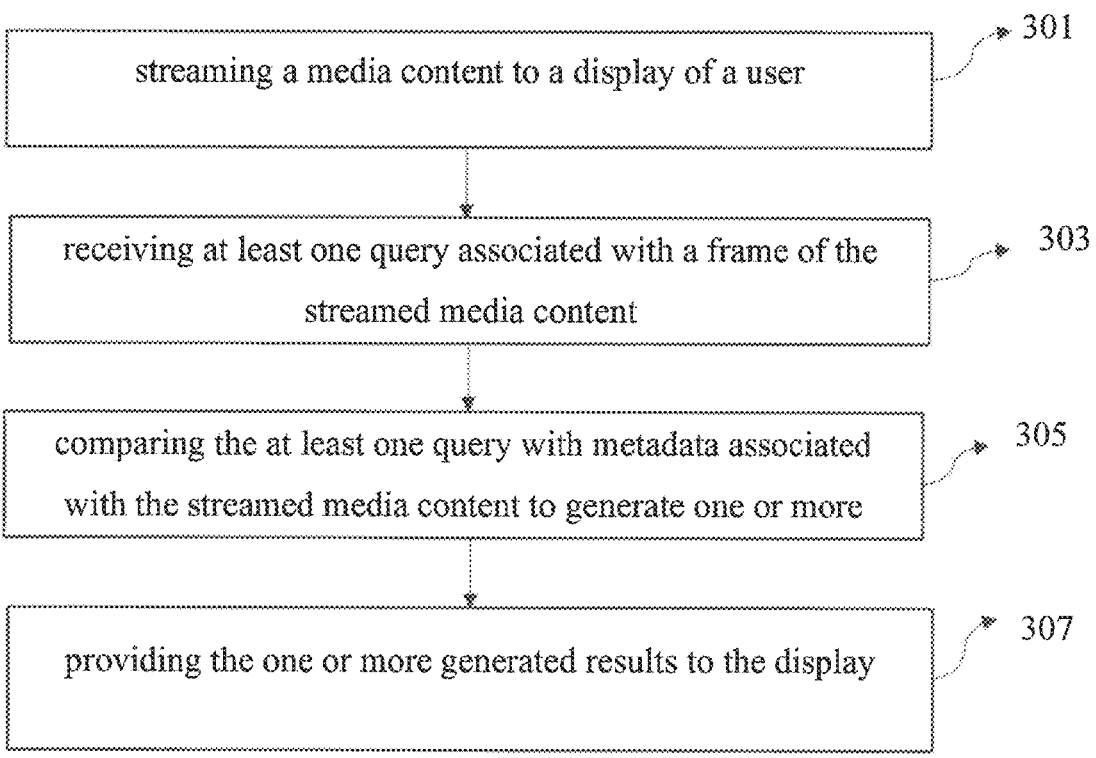
FIG. 3 depicts a flowchart 300 illustrating an example of a method providing auxiliary content search on the streaming media content, in accordance with some embodiments of the present disclosure.

FIG. 3 depicts a flowchart 300 illustrating an example of a method providing auxiliary content search on the streaming media content in accordance with some embodiments of the present disclosure.

At block 301, media content is streamed to a display of a user. The streamed media content may comprise, for example, a webcast, a movie, a TV show, a series of music videos, etc. The media content may be streamed from various OTT platforms such as Amazon Prime Video, Netflix, and the like. However, those of ordinary skill in the art will appreciate that the streamed media content and OTT platforms are not limited to those just listed, as any other streamed media content and video platform is well within the scope of present disclosure.

While media content is streamed, the user can pause the video and request to explore it in further detail based on the user's personal interest or preference. At block 303, at least one query is received from the user. The at least one query may be associated with a frame of the streamed media content on which user has paused the video.

The at least one query may be an audio or a text input. The user may provide the text input through generic or virtual keyboard. The user may provide the audio input via an in-built microphone, or a microphone connected to the user device. The user device may store the at least one query for further processing.

At block 305, the at least one query may be compared with a metadata associated with the streamed media content to generate one or more results. The metadata is chunked or tagged along with the media content before it is transmitted to a media gateway for streaming the media content to display of the user.

The metadata associated with the streamed media content may in some embodiments comprise at least one of: geographical coordinates associated with a location present in the frame of the streamed media content, a name of the location present in the frame of the streamed media content, the date and time of recording the streamed media content, details of one or more artists present or associated with the streamed media content, and information associated with one or more objects present in the streamed media content, or any combinations thereof.

The comparison of at least one query with the metadata associated with the streamed media content comprises applying natural language processing (NLP) technique and text analytics techniques to the at least one query to determine one or more keywords present in the at least one query. The method 300 then matches the one or more keywords with the metadata chunked with the media content and generates the one or more results in response to the one or more keywords matching the metadata chunked with the media content.

In an embodiment of the present disclosure, if the one or more keywords of the at least one query do not match the metadata chunked with the media content, the method 300 may apply a computer vision technique on the present frame to identify at least one object present in the frame of the media content. The computer vision technique may be applied through a convolution neural network. The convolution neural network may be trained with plurality of pictures for a number of iterations to identify an object.

After identifying the at least one object, the method 300 searches at least one database for details of the at least one query based on the identified object and generates one or more results based on the search. In one non-limiting embodiment of the present disclosure, the user may provide feedback to improve the search results.

In another embodiment of the present disclosure, the metadata may not be chunked with the media content to save bandwidth when transmitting the media content to the display of the user. In such scenario, when the one or more keywords of the at least one query do not match the metadata chunked with the media content, the method 300 may retrieve metadata that matches the one or more keywords from the metadata server and may generate the one or more results based on the retrieved metadata.

In yet another embodiment of the present disclosure, if the one or more keywords of the at least one query do not match the metadata chunked with the media content, the method 300 may transmit the at least one query to a metadata server A metadata service administrator may process the at least one query and update existing repository of the metadata server to include details associated with the at least one query. The user may be then notified with the details associated with the at least one query.

In one non-limiting embodiment, the user may be notified on the registered mobile device via a text message. In another non-limiting embodiment, the details associated with the at least one query may be directly transmitted to the user device from where the at least one query was requested. In yet another non-limiting embodiment, the details associated with the at least one query may be chunked with the media content and stored on the cloud server for future streaming.

In an embodiment of the present disclosure, the one or more results are generated based on a context of the presently streamed media content. The one or more results comprise at least one or more navigation links to different media contents associated with the context of the streamed media content, maps for navigating to a location present in the streamed media content, details of objects present in the frame, recommendations based on the context of the streamed media content.

At block 307, one or more generated results may be displayed on the display of the user. In one non-limiting embodiment of the present disclosure, the user may navigate through one or more results based on user's preference or user's interest and return to the presently streamed media content later.

In an embodiment of the present disclosure, a selection of at least one result among the one or more generated results is received from the user via the user interface. The user may then navigate to another media content based on the selected at least one result.

Thus, the method 300 provides a dynamic user engagement with streaming media content and provides auxiliary content search on the streaming media content based on the user's personal interest or preference. In addition, the method 300 ensures efficient content delivery and superior Quality of Experience (QoE) to the user.

In another non-limiting embodiment of the present disclosure, the steps of method 300 may be performed in an order different from the order described above.

Figure 4:
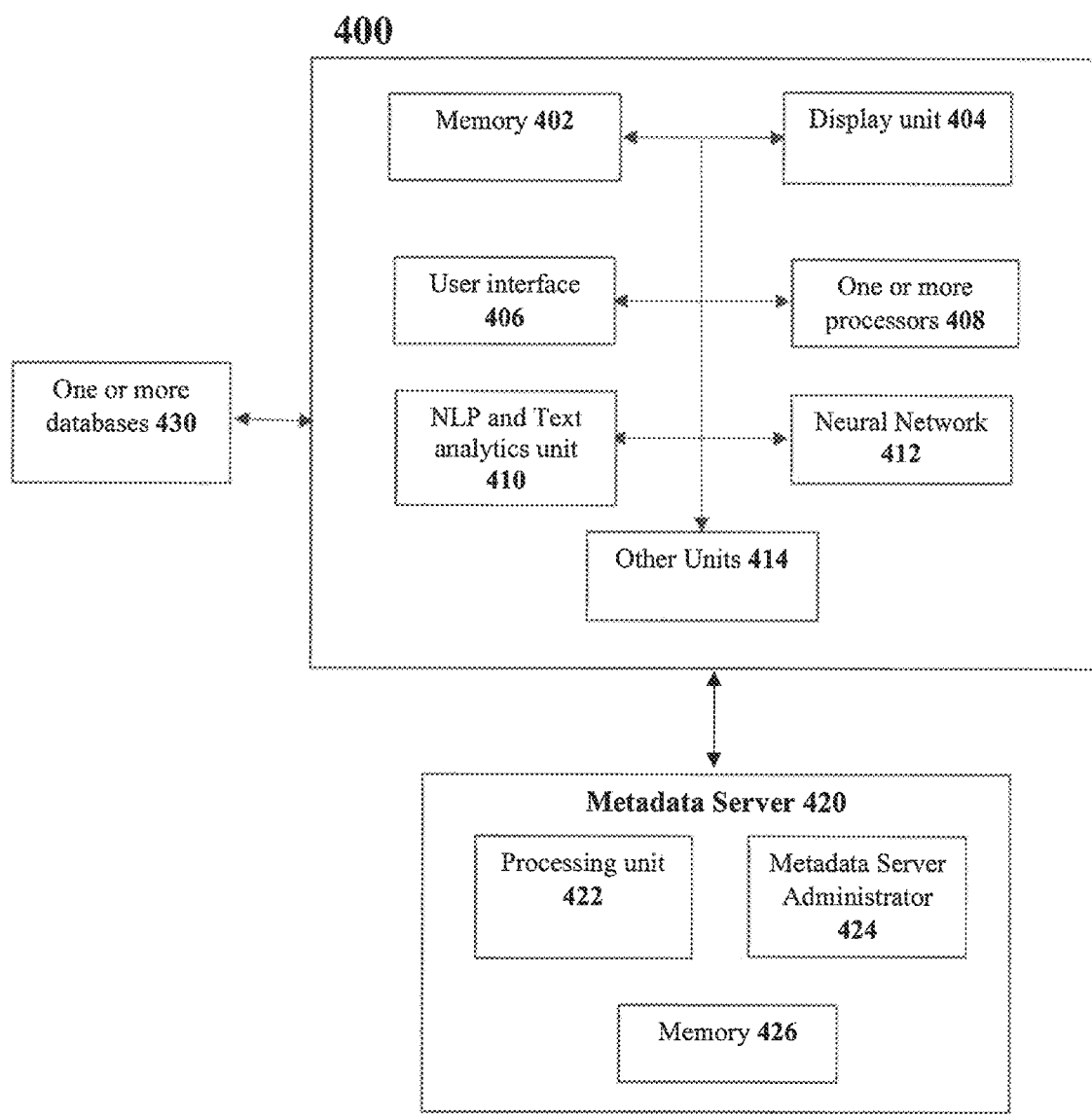
FIG. 4 shows a block diagram of a system 400 providing auxiliary content search on the streaming media content, in accordance with some embodiments of the present disclosure.

FIG. 4 shows a block diagram of a system 400 providing auxiliary content search on the streaming media content in accordance with some embodiments of the present disclosure.

In an embodiment of the present disclosure, the system 400 comprises of a memory 402, a display unit 404, user interface 406, one or more processors 408, an NLP and text analytics unit 410, neural network 412, communicatively coupled with each other. The system 400 is not limited to the units just described, i.e., the system 400 may also include other units 414, which may include communications hardware such as a modem or other gateway device, a wireless or other network adapter, etc. In some embodiments, the system 400 may be a personal computer, a mobile device (such as a smartphone or a tablet), a digital media player, a smart TV, or a television with integrated smart TV platforms such as fire TV stick, etc.

In an embodiment of the present disclosure, the system 400 may be in communication with a metadata server 420 and one or more databases 430. The metadata server 420 may comprise a processing unit 422, a media service administrator 424 and a memory 426 communicatively coupled with each other. The system 400 may be configured to transmit and receive information from the metadata server 420 and the one or more databases 430.

The display unit 404 may be configured to stream a media content on a display of a user. The streamed media content may comprise one of webcasts, movies, TV shows and music videos of streaming content. The media content may be streamed from various OTT platforms such as Amazon Prime Video, Netflix, and the like. However, the streamed media content and OTT platforms are not limited to above and any other streamed media content and video platform are well within the scope of present disclosure.

While media content is streamed, the user can pause the video and further explore the paused content as desired. The user interface 406 may be configured to receive at least one query from the user. The at least one query may be associated with a frame of the streamed media content on which the user has paused the video.

The at least one query may be an audio or a text input. The user may provide the text input through a generic or a virtual keyboard. The user may provide the audio input via an in-built microphone or a microphone connected to the device of the user. The device may store the at least one query for further processing.

The one or more processors 408 may be configured to compare the at least one query with a metadata associated with the streamed media content to generate one or more results. The metadata is chunked or tagged along with the media content it is transmitted to a media gateway for streaming it on the display of the user. The processing unit 422 of the metadata server 420 may be configured to chunk the metadata with the media content as shown in FIG. 1.

The metadata associated with the streamed media content may comprise at least one of: geographical coordinates associated with a location present in the frame of the streamed media content, the name of the location present in the frame of the streamed media content, the date and time of recording the streamed media content, details of one or more artists present or associated with the streamed media content, information associated with one or more objects present in the streamed media content, or any combination thereof.

To compare the at least one query with the metadata associated with the streamed media content, the one or more processors 408, using the NLP and Text analytics unit 410, may be configured to apply natural language processing (NLP) techniques and text analytics techniques to the at least one query to determine one or more keywords present in the at least one query.

The one or more processors 408 may be configured to match the one or more keywords with the metadata chunked with the media content and generate the one or more results in response to the one or more keywords matching the metadata chunked with the media content. The one or more generated results may comprise at least a portion of the metadata matching the one or more keywords.

In an embodiment of the present disclosure, if the one or more keywords of the at least one query do not match the metadata chunked with the media content, the one or more processors 408, using a neural network 412, may be configured to apply a computer vision technique on the present frame of the media content to identify at least one object present in the frame. The neural network 412 may be a convolution neural network and may be trained with plurality of pictures for a number of iterations to identify an object.

After identifying the at least one object, the one or more processors 408 may be configured to search at least one database 430 for details on the at least one query based on the identified object. The one or more processors 408 may generate one or more results based on the search. In one non-limiting embodiment of the present disclosure, the user may provide feedback to improve the search results.

In another embodiment of the present disclosure, the metadata may not be chunked with the media content for saving the bandwidth in transmitting the media content to the display of the user. In such scenario, the one or more keywords of the at least one query do not match the metadata chunked with the media content. The one or more processors 408, using the other units 414, may be configured to transmit one or more keywords to the metadata server 420 and retrieve metadata that matches the one or more keywords from the metadata server 420. The one or more processors 408 may generate the one or more results based on the retrieved metadata.

In yet another embodiment of the present disclosure, if one or more keywords of the at least one query does not match the metadata chunked with the media content, the one or more processors 408, using the other units 414, may be configured to transmit the at least one query to a metadata server 420.

The metadata service administrator 424 of the metadata server 420 may be configured to process the at least one query and update existing repository of the metadata server to include details associated with the at least one query. The metadata service administrator 424 may be configured to notify the details associated with the at least one query to the user.

In one non-limiting embodiment, the user may be notified on the registered mobile device via a text message. In another non-limiting embodiment, the details associated with the at least one query may be directly transmitted to the user device from where the at least one query was requested. In yet another non-limiting embodiment, the details associated with the at least one query may be chunked with the media content and stored in the memory 426 of the metadata server 420 for future streaming.

The display unit 404 may be configured to display one or more generated results on the device of the user. In one non-limiting embodiment of the present disclosure, the one or more processors 408 may receive a selection of at least one result among the one or more generated results via the user interface 406. The user may then navigate through one or more results based on the user's preference or interest and return to the presently streamed media content later.

In an embodiment of the present disclosure, the one or more results are generated based on a context of the presently streamed media content. The one or more results may comprise at least one of one or more navigation links to different media contents associated with the context of the streamed media content, maps for navigating to a location present in the streamed media content, details of objects present in the frame, recommendations based the context of the streamed media content.

Thus, the system 400 may provide dynamic user engagement with streaming media content and provides auxiliary content search on the streaming media content based on the user's personal interest or preference. In addition, the system 400 ensures efficient content delivery and superior Quality of Experience (QoE) to the user.

In an embodiment, the units 410, 414, and 422 may be dedicated hardware units capable of executing one or more instructions stored in the memory 402 or memory 426 for the system 400 and metadata server 420. In another embodiment, the units 410, 414, and 422 may be software modules stored in the memory 401 or memory unit 402 which may be executed by the at least one processor for performing the operations of the system 400 and metadata server 420.

The one or more processors 408 and the processing unit 422 may include, but are not restricted to, a general-purpose processor, a Field Programmable Gate Array (FPGA), an Application Specific Integrated Circuit (ASIC), a Digital Signal Processor (DSP), microprocessors, microcomputers, micro-controllers, digital signal processors, central processing units, state machines, logic circuitries, and/or any devices that manipulate signals based on operational instructions. The system 400a and 400b may comprise interfaces including a variety of software and hardware interfaces, for example, a web interface, a graphical user interface, an input device-output device (I/O) interface, an access network interface and the like.

The memory 402 and the memory 426 may comprise various software modules/codes such as, but not limited to, Bluetooth and Wi-Fi drivers. The memory 401 and the memory unit 402 may include a Random-Access Memory (RAM) unit and/or a non-volatile memory unit such as a Read Only Memory (ROM), optical disc drive, magnetic disc drive, flash memory, Electrically Erasable Read Only Memory (EEPROM), a memory space on a server or cloud and so forth.

In a non-limiting embodiment of the present disclosure, one or more non-transitory computer-readable media may be utilized for implementing the embodiments consistent with the present disclosure. A computer-readable media refers to any type of physical memory (such as the memory 401 and memory 426) on which information or data readable by a processor may be stored. Thus, a computer-readable media may store one or more instructions for execution by the at least one processor, including instructions for causing the at least one processor to perform steps or stages consistent with the embodiments described herein. The term "computer-readable media" should be understood to include tangible items and exclude carrier waves and transient signals. By way of example, and not limitation, such computer-readable media can comprise Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Thus, certain aspects may comprise a computer program product for performing the operations presented herein. For example, such a computer program product may comprise a computer readable media having instructions stored (and/or encoded) thereon, the instructions being executable by one or more processors to perform the operations described herein. For certain aspects, the computer program product may include packaging material.

The terms "an embodiment", "embodiment", "embodiments", "the embodiment", "the embodiments", "one or more embodiments", "some embodiments", and "one embodiment", "other embodiment", "yet another embodiment", "non-limiting embodiment" mean "one or more (but not all) embodiments of the disclosure(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

A description of an embodiment with several components in communication with each other does not imply that all such components are required. On the contrary, a variety of optional components are described to illustrate the wide variety of possible embodiments of the disclosed methods and systems.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the embodiments of the present disclosure are intended to be illustrative, but not limiting, of the scope of the disclosure, which is set forth in the appended claims.

| Referral Numerals: | |
|---|---|
| Reference Number | Description |
| 100 | ARCHITECTURE |
| 101 | CLOUD SERVER |
| 103 | MEDIA CONTENT DELIVERY NETWORK |
| 105 | METADATA SERVICE UNIT |
| 106 | DATA CHUNKS |
| 107 | CUSTOMER PREMISES EQUIPMENT |
| 109 | USER |
| 110 | USER DEVICE |

-continued

Referral Numerals:

| Reference Number | Description |
| --- | --- |
| 200 | SCENARIO |
| 210 | SCENARIO |
| 300 | METHOD |
| 400 | BLOCK DIAGRAM OF SYSTEM |
| 402 | MEMORY |
| 404 | DISPLAY UNIT |
| 406 | USER INTERFACE |
| 408 | ONE OR MORE PROCESSORS |
| 410 | NLP AND TEXT ANALYTICS UNIT |
| 412 | NEURAL NETWORK |
| 414 | OTHER UNITS |
| 420 | METADATA SERVER |
| 422 | PROCESSING UNIT |
| 424 | METADATA SERVER ADMINISTRATOR |
| 426 | MEMORY |

What is claimed is:

1. A method comprising:
streaming media content to a display of a user;
receiving at least one query associated with a frame of the streamed media content;
comparing the at least one query with metadata associated with the streamed media content to generate one or more results;
providing the one or more generated results to the display;
wherein comparing the at least one query with metadata associated with the streamed media content comprises:
applying natural language processing (NLP) technique and text analytics technique to the at least one query to determine one or more keywords present in the at least one query;
comparing the one or more keywords with the metadata chunked with the media content; and
generating the one or more results if the one or more keywords match the metadata chunked with the media content; and
wherein in response to the one or more keywords not matching the metadata chunked with the media content, identifying at least one object in a frame associated with the at least one query using a computer vision technique;
searching at least one database based on the at least one query and the at least one identified object; and
generating the one or more results based on the search.

2. The method of claim 1, wherein the metadata associated with the streamed media content comprises at least one of: geographical coordinates associated with a location present in the frame of the streamed media content, name of the location present in the frame of the streamed media content, date and time of recording the streamed media content, details of one or more artists present or associated with the streamed media content, and information associated with one or more objects present in the streamed media content or any combinations thereof.

3. The method of claim 1, wherein the one or more results are generated based on a context of the streamed media content, and wherein the one or more results comprises at least one of one or more navigation links to different media contents associated with the context of the streamed media content, maps for navigating to a location present in the streamed media content, details of objects present in the frame, recommendations based the context of the streamed media content.

4. The method of claim 1, wherein the metadata is chunked along with the media content before transmitting to a media gateway for streaming the media content on the display of the user.

5. The method of claim 1, further comprising:
in response to the one or more keywords not matching the metadata chunked with the media content, retrieving metadata that matches the one or more keywords from a metadata server; and
generating the one or more results based on the retrieved metadata.

6. The method of claim 1, further comprising:
in response to the one or more keywords not matching the metadata chunked with the media content, transmitting the at least one query to a metadata server;
processing the at least one query by a metadata service administrator;
updating existing repository of the metadata server to include details associated with the at least one query; and
notifying the user with the details associated with the at least one query.

7. The method of claim 1, further comprising:
receiving a selection of at least one result among the one or more generated results; and
navigating the user to another media content based on the selected at least one result.

8. A system comprising:
a memory;
a display unit in communication with the memory and configured to stream media content to a display; and
a user interface in communication with the display unit and the memory, and configured to receive at least one query associated with a frame of the streamed media content; and
one or more processors in communication with the display unit, the user interface, and memory, wherein the one or more processors are configured to provide one or more generated results on the display of the user, the one or more generated results produced by comparing the at least one query with metadata associated with the streamed media content; wherein comparing the at least one query with metadata associated with the streamed media content comprises:
applying natural language processing (NLP) technique and text analytics technique to the at least one query to determine one or more keywords present in the at least one query;
comparing the one or more keywords with the metadata chunked with the media content; and
generating the one or more results if the one or more keywords match the metadata chunked with the media content; and
wherein in response to the one or more keywords not matching the metadata chunked with the media content, identifying at least one object in a frame associated with the at least one query using a computer vision technique;
searching at least one database based on the at least one query and the at least one identified object; and
generating the one or more results based on the search.

9. The system of claim 8, wherein the metadata associated with the streamed media content comprises at least one of: geographical coordinates associated with a location present in the frame of the streamed media content, name of the location present in the frame of the streamed media content, date and time of recording the streamed media content, details of one or more artists present or associated with the streamed media content, and information associated with one or more objects present in the streamed media content or any combinations thereof.

10. The system of claim 8, wherein the one or more results are generated based on a context of the streamed media content, and wherein the one or more results comprises at least one of one or more navigation links to different media contents associated with the context of the streamed media content, maps for navigating to a location present in the streamed media content, details of objects present in the frame, recommendations based the context of the streamed media content.

11. The system of claim 8, wherein the metadata is chunked along with the media content before transmitting to a media gateway for streaming the media content on the display of the user.

12. The system of claim 8, wherein the one or more processors are further configured to:
   retrieve metadata that matches the one or more keywords from a metadata server in response to the one or more keywords not matching the metadata chunked with the media content; and
   generate the one or more results based on the retrieved metadata.

13. The system of claim 8, further comprising:
   a transceiver in communication with the one or more processors,
   wherein the transceiver is configured to:
      transmit the at least one query to a metadata server; and
      wherein:
         the metadata server comprises a metadata service administrator for processing the at least one query, updating existing repository of the metadata server to include details associated with the at least one query, and notifying the user with the details associated with the at least one query.

14. The system of claim 8, wherein the one or more processors are further configured to: receive, via the user interface, a selection of at least one result among the one or more generated results; and navigate the user to another media content based on the selected at least one result.

* * * * *